July 5, 1949.  W. V. VARNER  2,475,533
AIR PRESSURE INDICATOR
Filed March 2, 1946  2 Sheets-Sheet 1
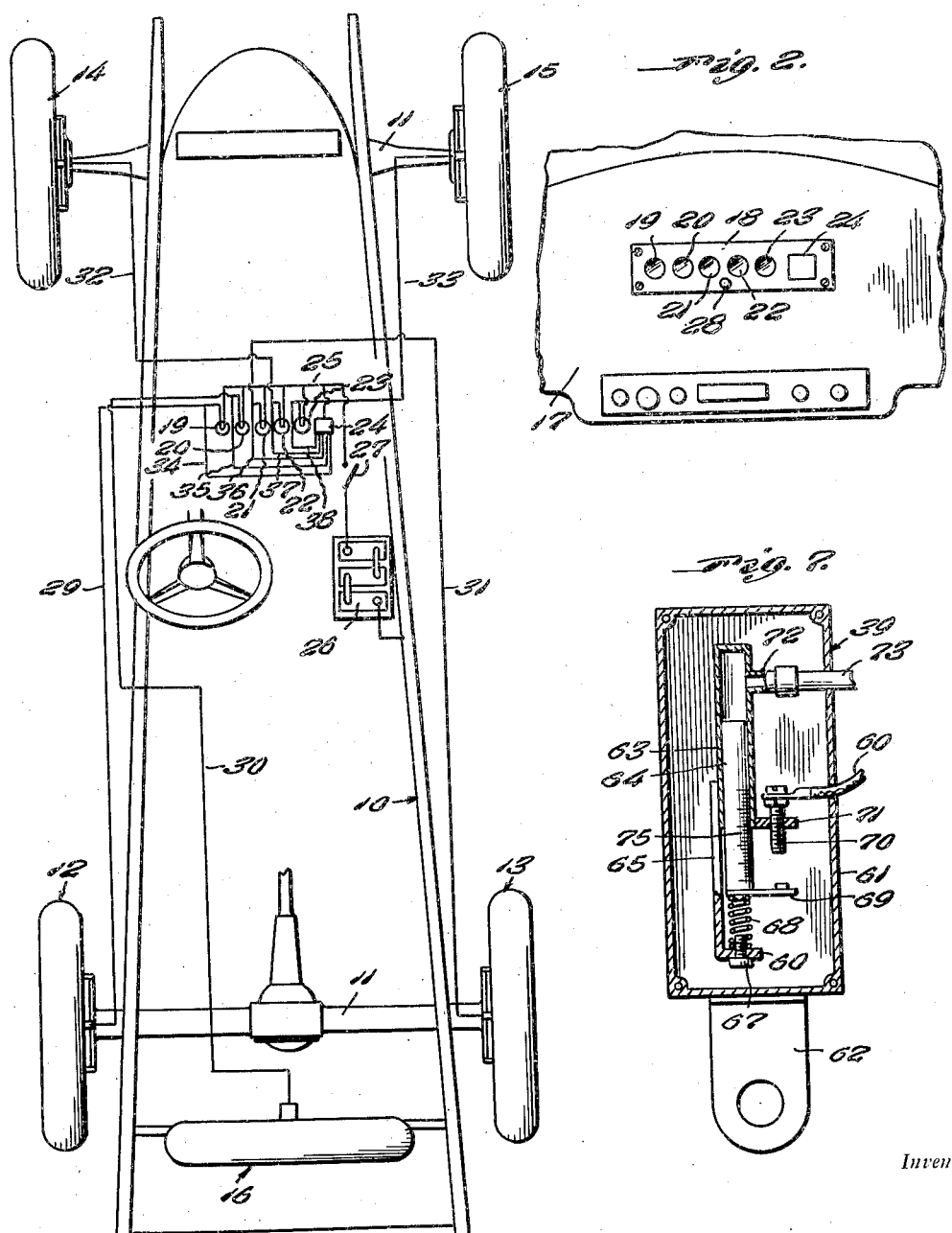
Inventor
W. V. Varner
By Clarence A. O'Brien
and Harvey B. Jacobson
Attorneys July 5, 1949. W. V. VARNER 2,475,533
AIR PRESSURE INDICATOR
Filed March 2, 1946 2 Sheets-Sheet 2
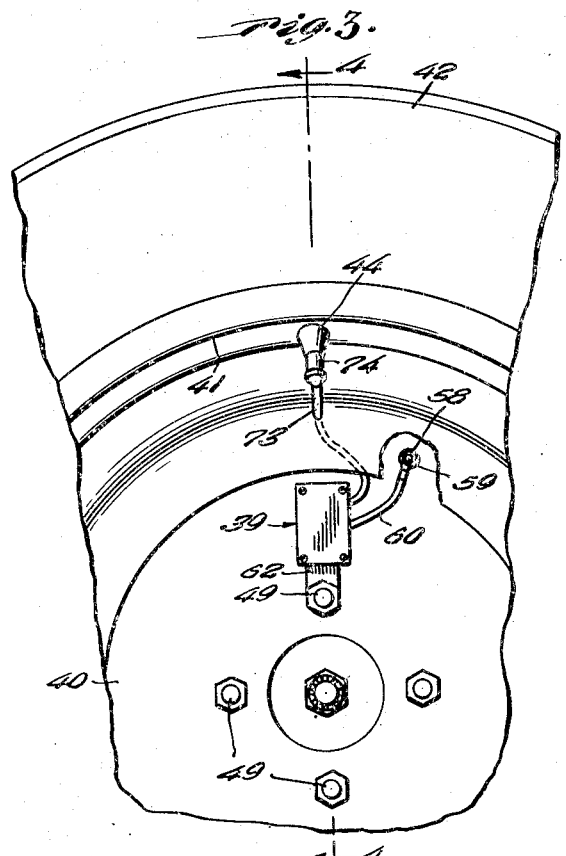
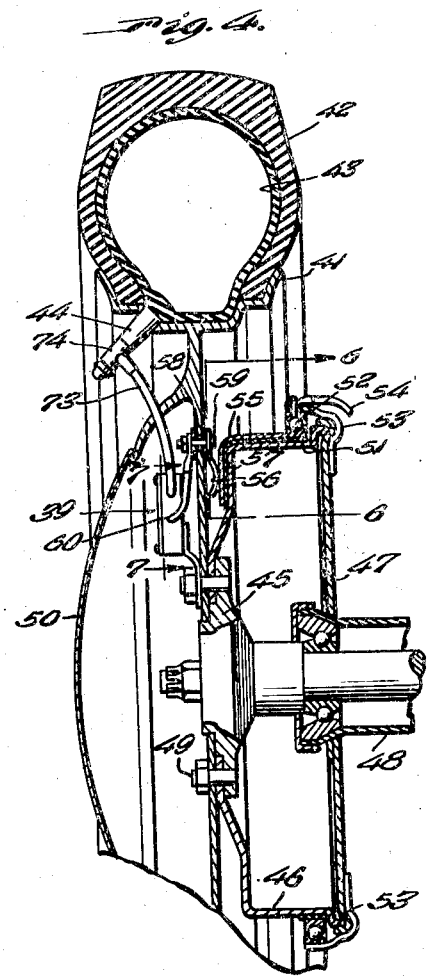
Inventor
W. V. Varner
By Clarence A. O'Brien
and Harvey B. Jacobson
Attorneys Patented July 5, 1949

2,475,533

UNITED STATES PATENT OFFICE 2,475,533

AIR PRESSURE INDICATOR

William V. Varner, Atmore, Ala.

Application March 2, 1946, Serial No. 651,588

2 Claims. (Cl. 200—58)

This invention relates to an air pressure indicator and more particularly to a signaling device to indicate the loss of pressure in a tire.

The primary object of the invention is to notify the driver of a vehicle of the loss of pressure in a tire or tires without requiring the stopping of the vehicle and testing of each tire individually.

Another object is to indicate which tire on the vehicle requires additional inflation in order to restore the air pressure in the tire to a predetermined value.

A further object of the invention is to produce a visible warning signal together with an audible warning signal so that the driver's attention will automatically be called to the signal when the pressure in any one of the tires falls below a predetermined value.

A further object is to regulate the pressure value at which the signal will be given.

The above and other objects may be attained by employing this invention which includes a visual signal mounted on the instrument panel of a vehicle for each wheel, a pressure gauge carried by each wheel, a fixed contact mounted adjacent the pressure gauge and connected electrically to one of the signals, and a movable contact operated by the pressure gauge to engage the fixed contact and close an electrical circuit through its respective signal when the pressure in a tire on its respective wheel falls below a predetermined value.

Other features include means to regulate the pressure value at which the signal will be given.

Still other features include an audible signal operating in conjunction with the visible signals so as to call the driver's attention to the signal when the pressure in any one of the tires falls below a predetermined value.

In the drawings:

Figure 1 is a plan view of a chassis of a vehicle showing diagrammatically this improved signaling system mounted thereon, Figure 2 is a fragmentary face view of an instrument panel showing the visible and audible signals mounted thereon, Figure 3 is a fragmentary enlarged view of a wheel and tire equipped with my improved signaling system, Figure 4 is a transverse sectional view taken substantially along the line 4—4 of Figure 3, Figure 5 is an edge view of a wheel, certain portions being shown in section to illustrate the application of my invention thereto, Figure 6 is a fragmentary sectional view taken substantially along the line 6—6 of Figure 4, and Figure 7 is a fragmentary enlarged sectional view taken substantially along the line 7—7 of Figure 4.

Referring to the drawings in detail, a chassis designated generally 10 is equipped with the customary axles 11 on which the wheels 12, 13, 14, 15 and the spare 16 are mounted. Carried by the conventional instrument panel 17 of the vehicle is my improved signal panel 18 on which is supported a series of sockets for the reception of miniature electric signaling lamps 19, 20, 21, 22 and 23, and a buzzer or similar audible signal 24. One terminal of each of the lamps 19, 20, 21, 22 and 23 and one terminal of the buzzer 24 is connected through a common conductor 25 to a power source 26 such as the ordinary electric storage battery with which the vehicle 10 is normally equipped. A switch 27 is preferably arranged in the conductor 25 between the signal terminal and the power source 26 so that the signal may be manually cut out at the will of the user. This switch is preferably controlled by a button 28 which projects through the front face of the panel 18 as indicated in Figure 2. The terminal of the signal 19 opposite that which is connected to the conductor 25 has connected thereto a conductor 29 which leads to the left rear wheel 12 of the vehicle to be connected in a manner to be hereinafter described to a pressure gauge carried by the wheel. A similar conductor 30 leads from the terminal of the signal 20 opposite that connected with the conductor 25 to the pressure gauge carried by the spare 16, and the terminal of the signal 21 opposite that connected to the conductor 25 is connected to a conductor 31 which leads to the right rear wheel 13. A conductor 32 is connected to the terminal of the signal 22 opposite that which is connected to the conductor 25 and leads to the left front wheel 14 and a conductor 33 leads from the terminal of the signal 23 opposite that connected to the conductor 25 to the right front wheel 15. The terminal of the buzzer 24 opposite that connected to the conductor 25 is connected to a series of conductors 34, 35, 36, 37 and 38 to the respective conductors 29, 30, 31, 32 and 33, so that when the circuit is completed through any one of the signals 19, 20, 21, 22 or 23, the buzzer 24 will be set into operation.

In order to regulate the flow of electrical power through the various signals, each wheel 12, 13, 14, 15 and 16 is provided with my improved pressure gauge, designated generally 39. Each wheel comprises the conventional wheel body or disc 40 carrying at its periphery a conventional rim 41 upon which is mounted in the conventional manner a tire 42 equipped with a conventional inner tube 43 which in turn is equipped with a conventional valve stem 44 which under normal conditions contains a tire valve of conventional construction. The wheel disc 40 is mounted on the conventional hub 45 carrying an ordinary form of brake drum 46, the inner face of which is closed by a conventional cover disc 47 held stationary on the axle housing 48. The wheel disc 40 is mounted on the hub 45 by the usual annular row of spaced lugs 49 which are enclosed in a conventional hub cap 50.

Supported on an annular peripheral band 51 of insulating material extending around the brake drum 46 is an anti-friction bearing 52, the outer race of which is fixed to the cover 47 at spaced intervals on fiber or insulating strips 53, and leading from the outer race of the anti-friction bearing 52 is a conductor 54 which is in turn connected to its respective conductor 29, 30, 31, 32 or 33 of the wheel on which the device is mounted. The inner race of the anti-friction bearing which rests on the insulating band 51 is provided with an outwardly extending tongue 55 which bends downwardly and around the brake drum 46 to form a fixed contact against which a yielding contact 56 carried by the wheel disc 40 is adapted to bear. A suitable layer of insulating material 57 separates the tongue 55 from the brake drum 46 as will be readily understood upon reference to the Figure 4. The yielding contact 56 is carried on a suitable insulated bushing 58 which extends through the wheel disc 40, and this yielding contact is connected through the medium of a conducting bolt 59 with a conductor 60 which leads into the pressure gauge 39 for a purpose to be more fully hereinafter described.

The pressure gauge 39 comprises a housing 61 having a perforated ear 62 at one end which serves as a mounting bracket for attaching the pressure gauge to the wheel disc 40 through the medium of one of the lugs 49. Mounted within the housing 61 is an air pressure cylinder 63 through one end of which a plunger 64 enters the cylinder. A bracket 65 extends from the open end of the cylinder through which the plunger 64 operates and is provided with an angularly extending arm 66 in which a spring centering screw 67 is mounted. The shank of the screw 67 aligns axially with the bore of the cylinder 63, and seated on the bracket surrounding the screw and bearing against the outer end of the plunger 64 is a compression coil spring 68 which normally tends to urge the plunger into the cylinder. A contact arm 69 is carried at the outer end of the plunger and is adapted to cooperate with a contact screw 70 which is adjustably mounted in an insulating bracket 71 carried by the cylinder 63 adjacent its open end. The conductor 60 is electrically connected with the screw 70 as will be readily understood upon reference to Figure 7. Communicating with the cylinder 63 near the end opposite that into which the plunger 64 extends, is a connecting nipple 72 to which one end of a flexible tube 73 is connected. The opposite end of the tube 73 leads to a T-shaped fitting 74 which is adapted to be threaded onto the valve stem 44 as illustrated in Figure 4. Before connecting the fitting 74 to the valve stem 44, the conventional air valve contained within the stem 44 is removed and placed in the fitting 74 to facilitate the inflation of the inner tube 43, and at the same time allow free access of the air pressure contained in the tube 43 to the flexible tube 73 and the cylinder 63 behind the piston 64. The piston or plunger 64 is preferably provided on its outer surface with a plurality of graduations 75 conforming to the conventional graduations employed on air pressure gauges of the ordinary type.

In operation, it will be understood that the inner tube of the tire 42 is inflated in the ordinary manner and when so inflated, the pressure of air therein will register on the graduation 75 of the plunger 64, it being understood that the plunger will be forced out of the cylinder 63 against the compression of the spring 68. As the pressure in a tire decreases, the plunger 64 will be urged into the cylinder 63 under the influence of the spring 68 until the contact arm 69 engages the screw 70. This action will ground the conductor 60 and thereby establish a flow of electrical energy from the power source 26 through the respective conductor 29, 30, 31, 32 or 33 and thus energize one of the signals 19, 20, 21, 22 or 23. Simultaneously the buzzer 24 will be set into operation, thus giving an audible signal as well as a visual signal, the audible signal being given irrespective of which of the visible signals may be set into operation. It will thus be seen that as soon as any one of the tires of the vehicle, or even the spare, becomes soft and the pressure therein lowered beyond a predetermined point, its respective signal 19, 20, 21, 22 and 23 will be operated so that the driver of the vehicle may easily and quickly determine which tire requires attention. Should it become necessary to demount the wheel from the hub, it is but a simple matter so to do by disconnecting the lugs 49 in the ordinary manner and separating the contact 56 from the tongue 55. Replacement of the wheel disc 40 on the hub 45 may likewise be readily accomplished without in any way interfering with the reestablishment of the signaling system.

While in the foregoing there has been shown and described the preferred embodiment of this invention it is to be understood that minor changes in the details of construction, combination and arrangement of parts may be resorted to without departing from the spirit and scope of the invention as claimed.

What I claim is:

1. An air pressure indicator comprising a housing, a tubular body within the housing, said tubular body being closed at one end, a plunger movable through the opposite end of the body, a fixed contact mounted on the body for longitudinal adjustment with relation thereto, a movable contact mounted on the plunger for movement therewith into and out of contact with the fixed contact, means for attaching the housing to the wheel mounting lug of a wheel equipped with a pneumatic tire and thus grounding the movable contact, means entering the body near its closed end for establishing communication between the interior of the body and the tire, means yieldingly to resist movement of the plunger under the influence of air entering the body from the tire, an anti-friction rotary conductor mounted on but electrically isolated from the wheel, and a conductor leading from the fixed contact to a rotatable element of the rotary conductor.

2. An air pressure indicator comprising a housing, a cylinder within said housing, said cylinder being closed at one end, a plunger extending through the opposite end of said cylinder, means for attaching the housing to the wheel mounting lug of a wheel equipped with a pneumatic tire, means establishing communication between the cylinder and the tire for conducting air into the cylinder and exerting pressure on the plunger, yielding means resisting movement of the plunger under the influence of air entering the cylinder, an adjustable contact carried by the cylinder, and a cooperating contact carried by the plunger and adapted when the pressure within the tire falls below a predetermined value to engage the adjustable contact.

W. V. VARNER.

REFERENCES CITED

The following references are of record in the file of this patent:

UNITED STATES PATENTS

| Number | Name | Date |
| --- | --- | --- |
| 1,115,022 | Quick | Oct. 27, 1914 |
| 1,144,834 | Freeman | June 29, 1915 |
| 1,924,921 | Frank | Aug. 29, 1933 |
| 2,063,452 | McDonnell | Dec. 8, 1936 |
| 2,248,047 | Addy et al. | July 8, 1941 |

OTHER REFERENCES

Article on page 410 of September 1928 edition of Science and Invention.